(No Model.) 2 Sheets—Sheet 2.

W. D. BROOKS.
CAN SOLDERING MACHINE.

No. 407,161. Patented July 16, 1889.

Attest
Walter Maddson
James Spear

Inventor
Wm. D. Brooks
by Ellis Spear
Atty

UNITED STATES PATENT OFFICE.

WILLIAM D. BROOKS, OF BALTIMORE, MARYLAND, ASSIGNOR OF ONE-THIRD TO D. D. MALLARY, OF SAME PLACE.

CAN-SOLDERING MACHINE.

SPECIFICATION forming part of Letters Patent No. 407,161, dated July 16, 1889.

Application filed May 13, 1889. Serial No. 310,500. (No model.)

*To all whom it may concern:*

Be it known that I, WILLIAM D. BROOKS, of Baltimore, in the State of Maryland, have invented a new and useful Improvement in Can-Soldering Machines; and I do hereby declare that the following is a full, clear, and exact description of the same.

My invention is an improvement in can-heading machines; and my object is to provide means whereby first one head and then the other is subjected to the soldering, the can being automatically inverted to present the heads successively to the soldering devices. It includes also a soldering-machine comprising can-seats or two tables or can holding and conveying means, combined with transferring and inverting mechanism which takes the can from one table and places it upon the other, inverting it at the same time, so that first one end is presented to the soldering devices and then the other. Further, it includes the means and arrangement of parts by which the machine is adapted for soldering either at the upper or lower end of the can, thus permitting the soldering of either outside or inside heads and also for capping.

Figure 1:
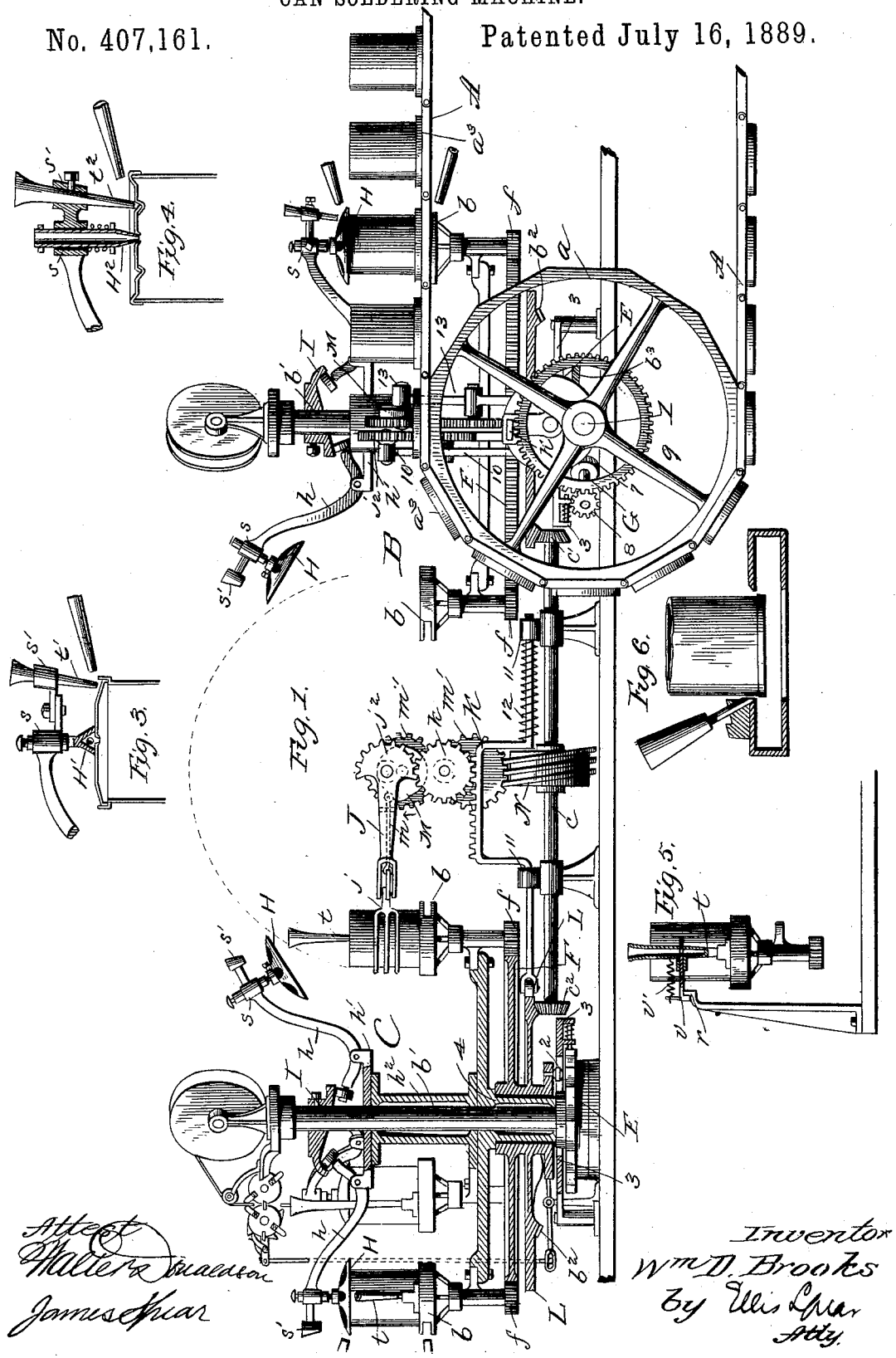
Figure 2:
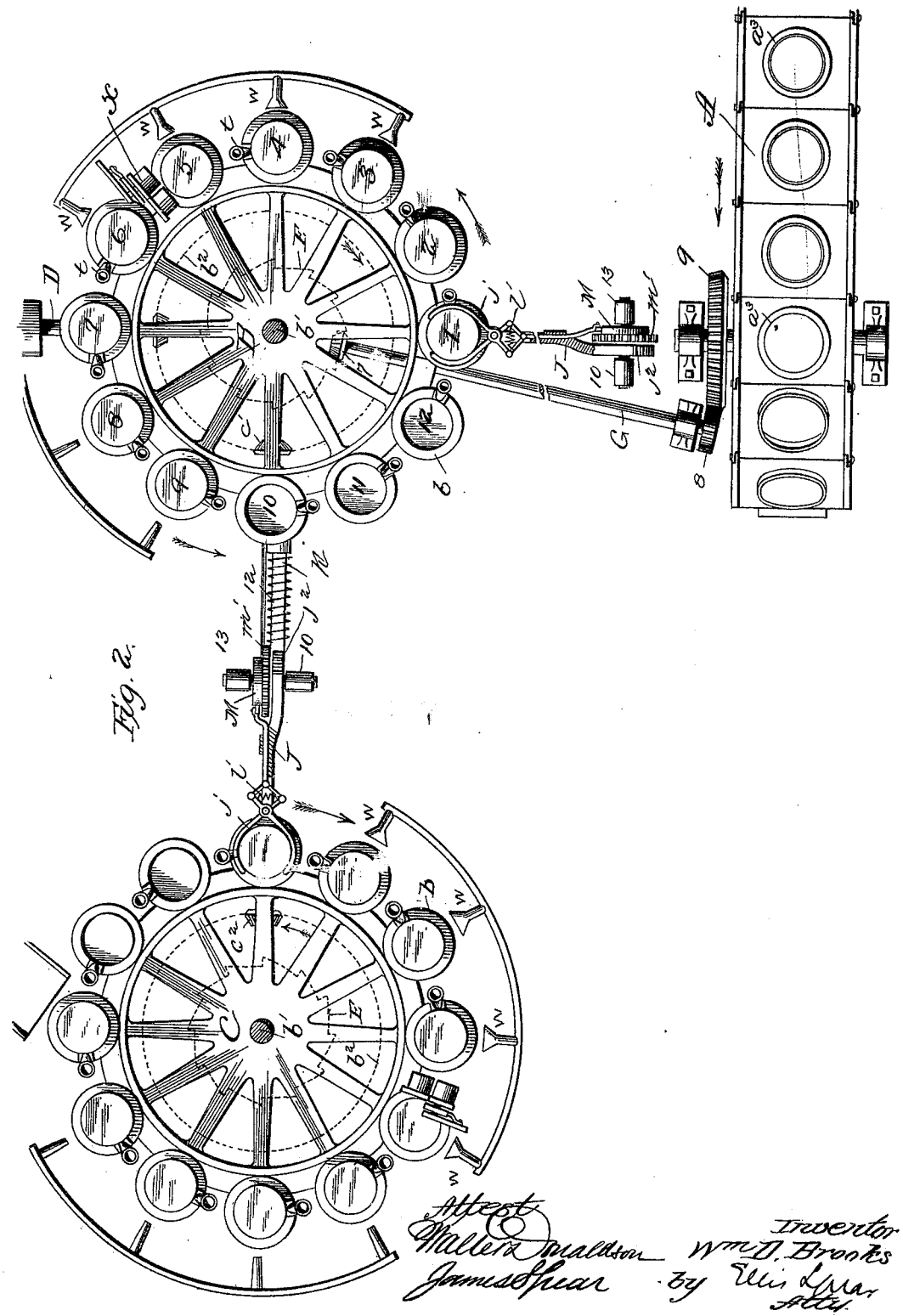

In the accompanying drawings, Figure 1 is a side elevation of the machine, partly in section. Fig. 2 is a plan view. Fig. 3 shows the can-head holder with solder-tube adapted for inside head. Fig. 4 shows a holder to be used in capping cans. Fig. 5 is a detail view of a solder-tube and an automatic valve for controlling the feeding of the solder. Fig. 6 is a detail of the means for supporting the solder-tube.

In the drawings, B C represent two revoluble tables, which may be considered representative devices for equivalent can holding and conveying means, such as an endless chain or a belt.

A is a primary can-conveyer, consisting of an endless belt or chain leading from any suitably point of supply, at which an attendant places the cans in the seats $a^3$, and it will be obvious that a number of such belts may radiate from a central point and a number of them fed by the same attendant. This conveyer runs around a drum $a$ upon a shaft 1, and is arranged preferably as in Fig. 2—that is, parallel with a line drawn between the centers of the tables B C. The tables are horizontal and the can-seats $b$ are shown as secured thereto in vertical positions, though they may be inclined, if desired. The table B is given a step-by-step movement by mechanism substantially similar to that shown in various patents of the United States granted to me—as, for instance, No. 254,948, of November 30, 1880. Each table is supported upon a stationary post $b'$. Power is transmitted through the shaft D, Fig. 2, by the beveled pinion, to the master-wheel $b^2$ of table B. This is carried upon a suitable sleeve and communicates movement to the table by a stud 2 on a flange of the sleeve working within a loop 3, which carries a pawl meshing with a ratchet E upon the sleeve 4 of the table. This mechanism is duplicated at the other wheel C, and reference is made to this as showing the mechanism more clearly. The can-seats, as in my former patent, are revolved by the gear F on the sleeve of the master-wheel meshing with the pinions $f$ of the can-seats. The table C is driven from the first table by the shaft $c$ and the pinions $c'$ $c^2$, meshing with the master-wheels $b^2$, respectively. The tables move intermittently in the directions of the arrows. Instead of having the second table combined with the master-wheel and pawl-and-ratchet mechanism for moving it, the connection may be made more direct in any desired manner. The drum of the primary conveyer is also driven from the table B, the means being the shaft G, having a pinion 7, meshing with the teeth $b^3$ of ratchet E, and a second pinion 8, meshing with a beveled gear 9 on the drum-shaft.

The cans are held to their seats by holders H, consisting of disks, as in Fig. 1, carried by pivoted levers $h$, supported by a plate $h'$ on the sleeve $h^2$ and revolving with the table. The inner ends of the levers have rollers riding upon a stationary cam I on the central post, by which the holders are lifted, as in Fig. 1, to permit the action of transferring and inverting the cans to be performed and also the feeding and discharge thereof. The same mechanism for transferring is used between the primary conveyer and the first table as between the two tables, and the particular description of one will suffice for both.

Fig. 1 shows a can as having been transferred and inverted from the table B to the table C. The transferring and inverting device consists of an oscillating arm J, carrying automatic grippers $j$ and arranged between the two tables, as in Fig. 1. It is provided with a toothed segment $j^2$, and is supported by a standard 10. A pinion $k$, supported by the standard, meshes with the segment, and this pinion is operated first one way and then the other by a rack K, sliding in bearings 11 and operated by a cam-face L on the master-wheel and a spring 12. The movements may be timed so that the arm carries the can from the first table B to the second one C during the period in which both the tables are at rest in their step-by-step movement, in which case the arm would begin its return to the first table before the tables start; or the tables, instead of moving in unison, may alternate in their periods of rest, in which case the arm would move from the first toward the second table during the movement of the latter and the rest of the former, the transferring and inverting being completed as soon as the second table comes to rest and the first begins to move.

The gripper-fingers $j\ j$ embrace the can about the center, and are in the form of toggle-levers pressed toward each other by a spring $l'$, and operated to separate by a rod $m$ and a cam M, supported by a standard 13. The cam is revolved continuously by means of pinions $m'\ m'$ and a worm N on the shaft connecting the two tables. The center of the cam is below the pivot of the transferring-arm, and by reason of this the said gripping-arms are properly operated. By reference to Fig. 1 it will be seen that the transferring and inverting of the can have been completed and the abutment on the cam M is about to release the gripping-fingers. As soon as this takes place the arm begins to move and the abutment keeps pace therewith and holds the fingers apart until the arm completes its movement and the fingers lie on each side of the can. The abutment now moves past the pusher-rod, and the spring, acting, causes the gripping-fingers to engage the can-sides. The abutment has to move the greater part of its path by reason of the cam being arranged below the pivot of the transferring-arm before it gets in its first-mentioned position, and this allows sufficient time for the transferring to be completed before the fingers are unclasped.

The duplicate mechanism used to transfer the cans from the primary conveyer A to the first table is shown in Fig. 2. The tables have preferably twelve can-seats. The transferred can, which we will suppose has an outside head, is placed upon seat No. 1, and the table B, revolving in the direction of the arrow, subjects the lower end of the can to the lower flames at stations 3 4 5, and at the latter station the solder is fed through the lower tubes by an automatic feeding and cutting device—such, for instance, as that described particularly in my Patent No. 389,438, and shown herein at $x$, this being representative mechanism for any other, as desired. After leaving station No. 5 the solder is completely "sweated" into the seam at No. 6, after which the cooling is done at stations 7 8 9. At station 10 the can is removed, inverted, and transferred to the second table, which revolves in the opposite direction, the heating, solder-feeding, and cooling device being arranged relatively the same as before described.

The can is discharged at station 10 of table $c$. Instead of arranging the solder-feeding station at the point shown, it may be placed at any other point, and the solder, after being fed and cut, can be retained in the solder-tube $t$ until the proper station is reached. For thus holding the solder within the tube a sliding valve $v$ may be used, as in Fig. 5, under tension of a spring $v'$, and automatically operated at the proper station by a cam or rib $r$, held in any suitable way. Instead of cutting devices, the solder may be supplied to the tubes by an attendant. The solder-tubes are supported on the upper stationary ring of the can-seat and their ends are arranged in proximity to the head-seam, the head in this case being placed upon the outside of the can-body. The flame-tubes are shown at W.

I design to adapt the machine for soldering either outside or inside heads and for capping, if desired, and for this purpose the holding-disk H is supported removably in the socket $s$ on the pivoted levers $h$, and when it is desired to solder the inside heads or caps the holders H' H², Figs. 3 and 4, are substituted for the disks, which allows room for the solder-feeding tubes $t'\ t^2$ to be properly positioned. The sockets $s$ have supplemental sockets $s'$ secured thereto or formed therewith, and in these the upper solder-tubes are held. A second set of flame and cooling tubes are used, arranged at the upper edge of the can to play upon these tubes. The tubes may be provided with valves, as in Fig. 5, and similar solder-feeding mechanism may be used. The upper tubes on both tables are used when inside heads are employed and the lower tubes when outside heads are to be soldered. By means of the upper and lower sets of solder-feeding tubes and flame-tubes the cans may be soldered on one table at both ends during a complete revolution of the machine by using outside heads for the lower end of the can and inside heads for the upper end. When the disks H are used as holders, the upper solder-tubes may be slightly raised, as in Fig. 1.

I claim as my invention—

1. In combination with a soldering-machine comprising can-seats, an inverter and transferrer for the cans positively operated to remove them from one seat and place them upon another, and means for operating said transferrer, substantially as described.

2. In combination with the two tables B C, with a series of can-seats and with soldering devices, the positively-operating can inverting and transferring mechanism for moving the can from one table to the other and means for operating said mechanism, substantially as described.

3. In combination, two can-seats arranged in the same horizontal plane, and a positively-operating inverter and transferrer with operating means, substantially as described.

4. In combination, the two can-seats and a gripping inverter and transferrer with operating means therefor, substantially as described.

5. In combination with the soldering-machine comprising can-seats, the oscillating pivoted arm and gripping mechanism carried thereby for moving the can from one seat to another and inverting it, substantially as described.

6. In combination with the soldering-machine, the pivoted arm having rack-teeth, the reciprocating rack in connection with the teeth of the pivoted arms for operating the arm, and the automatic gripping devices, substantially as described.

7. In combination with the two tables, the transferring arm and grip, said arm having rack-teeth, the reciprocating rack, and the intermediate pinion, substantially as described.

8. In combination, the tables, the transferring-arm, the reciprocating bar having connection thereto for operating the same, and the cam for operating the bar in one direction, and the means for retracting the bar, substantially as described.

9. In combination, the can-seats, the transferring-arm, the gripping-fingers carried thereby, and the cam for operating said fingers, substantially as described.

10. In combination, the can-seats, the transferring-arm, the gripping device, and the cam for operating said device, the said cam being arranged with its center to one side of the pivot of the transferring-arm, substantially as described.

11. In combination, the two tables, the shaft extending between them, the transferring-arm, the gripping device carried thereby, and the operating connection between said gripping device and the said shaft, substantially as described.

12. In combination, the two tables with can-seats, the transferring-arm, the gripping device, the cam with connections for operating said device, and the worm and the intermediate pinions for operating the cam, substantially as described.

13. In combination with the can-seats and can-holders, the sockets S' and the upper solder-tubes held in these sockets, substantially as described.

In testimony whereof I have signed my name to this specification in the presence of two subscribing witnesses.

WILLIAM D. BROOKS.

Witnesses:
   C. R. GALLAGHER,
   CHAS. H. HYNES.